C. A. PRATT.
BRAKE MECHANISM FOR STORAGE BATTERY LOCOMOTIVES.
APPLICATION FILED JULY 10, 1916.

1,256,592.

Patented Feb. 19, 1918.
2 SHEETS—SHEET 1.

Witnesses.
Ella Thieme

Inventor
Charles A. Pratt.
by Parker & Carter
his Attys

C. A. PRATT.
BRAKE MECHANISM FOR STORAGE BATTERY LOCOMOTIVES.
APPLICATION FILED JULY 10, 1916.
1,256,592.
Patented Feb. 19, 1918.
2 SHEETS—SHEET 2.
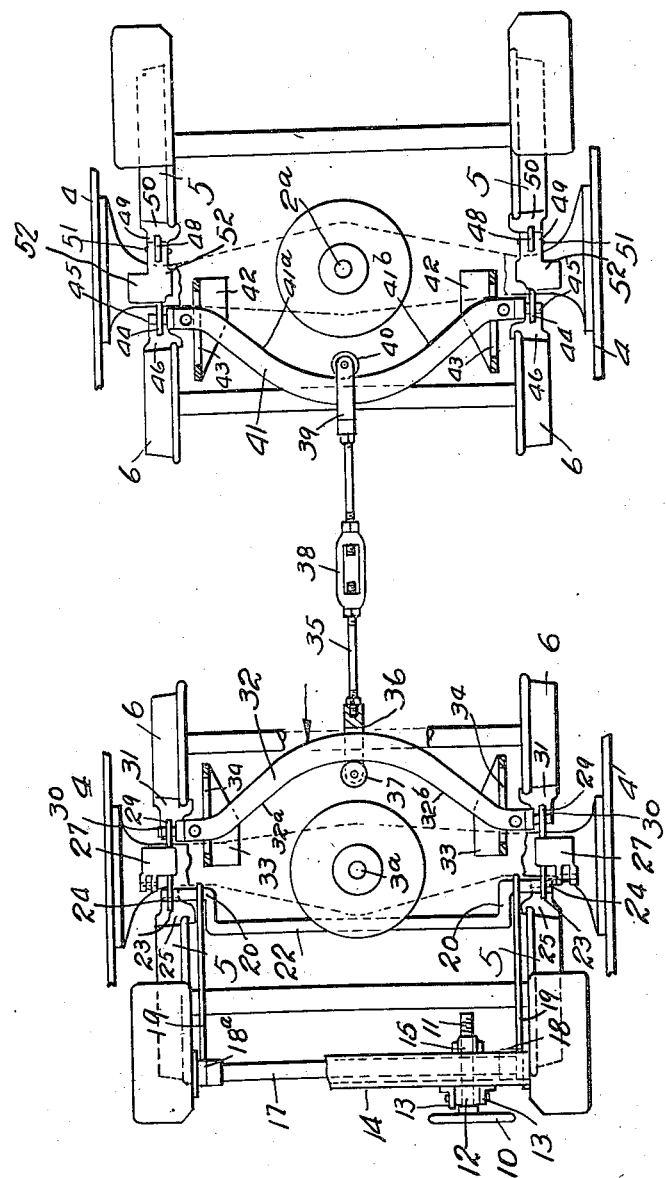

UNITED STATES PATENT OFFICE.

CHARLES A. PRATT, OF CHICAGO, ILLINOIS, ASSIGNOR TO GOODMAN MANUFACTURING COMPANY, OF CHICAGO, ILLINOIS, A CORPORATION OF ILLINOIS.

BRAKE MECHANISM FOR STORAGE-BATTERY LOCOMOTIVES.

1,256,592. Specification of Letters Patent. Patented Feb. 19, 1918.

Original application filed January 22, 1916, Serial No. 73,568. Patent No. 1,195,723. Divided and this application filed July 10, 1916. Serial No. 108,396.

*To all whom it may concern:*

Be it known that I, CHARLES A. PRATT, a citizen of the United States, residing at Chicago, in the county of Cook and State of Illinois, have invented a certain new and useful Improvement in Brake Mechanism for Storage-Battery Locomotives, of which the following is a specification.

This invention relates to improvements in brake mechanism for storage battery locomotives, and has for its object to provide a new and improved device of this description. The invention is illustrated in the accompanying drawings, wherein—

Fig. 2 is a plan view of the device shown in Fig. 1, with the body portion removed.

Like numerals refer to like parts throughout the several figures. This case is a divisional case containing the subject matter divided from my application for storage battery locomotives, filed January 22, 1916, Serial No. 73,568 which has become Patent No. 1,195,723, dated Aug. 22d, 1916.

Figure 1:
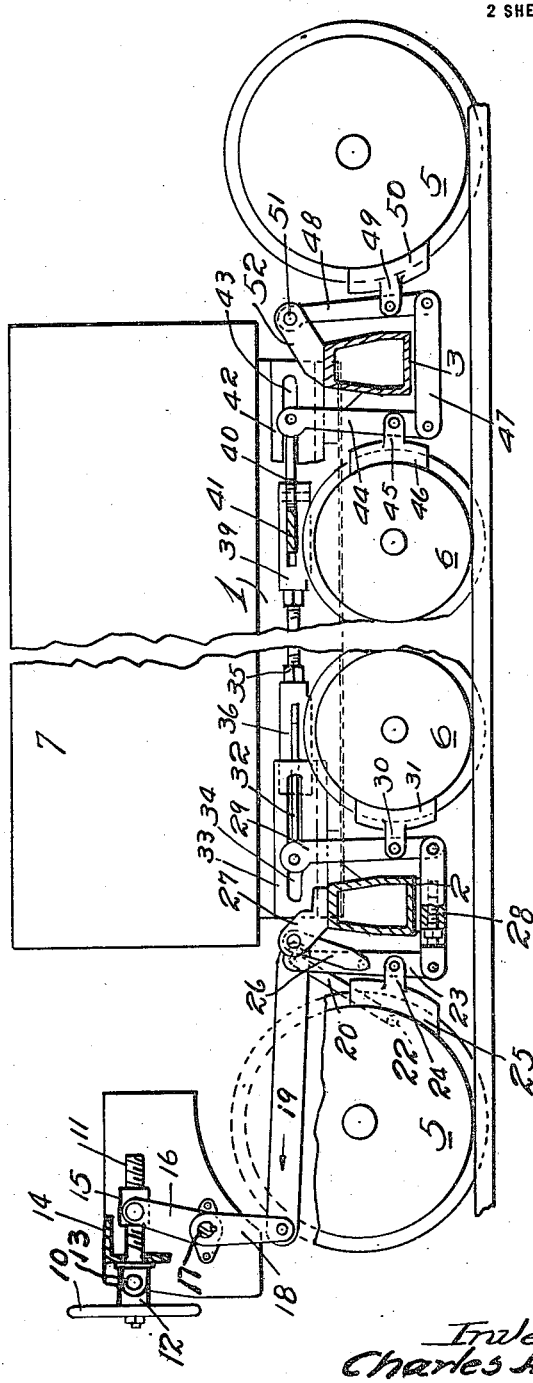
Figure 1 is a side elevation of a locomotive embodying the invention, with parts broken away.

For purposes of illustration, I have shown the braking mechanism in connection with a particular form of storage battery locomotive. This locomotive consists of three sections pivotally connected together, a central section 1, and two end sections 2 and 3, said sections being pivotally connected together by the pivots 2ª and 3ª. The two end sections may be similar in construction and are each provided with a suitable frame 4 mounted upon four wheels. Two of these wheels 5 are drivewheels and are made of the proper size for this purpose. The other two wheels 6 are smaller wheels and are located under the middle section 1 of the locomotive, upon which is carried the storage battery 7. It will be noted that the central or middle section only projects part way over each of the other sections. Some suitable driving mechanism is provided for driving the locomotive, such for example as shown in the original application, but as this feature is no part of my present invention I have not illustrated it. The middle or central section 1 is free from the wheels and consists of a main frame or reach bar pivotally connected at each end to the sections 2 and 3. This main frame may be made up in any desired manner. The wheels of the two end sections are provided with brakes adapted to be operated from one end of the locomotive. This requires a compensating structure in view of the three section construction of the locomotive. The brake mechanism must be so arranged that it will not be interfered with by the passing of the locomotives around curves on the track. In the construction shown the brakes are operated by means of a hand wheel 10. This hand wheel is connected with a threaded rod 11 which passes through a pivoted socket 12 pivoted to the lugs 13 on the frame 14. The screw threaded end of the rod 11 passes through the nut 15 which is pivotally connected with a crank 16 on a shaft 17 which extends across the locomotive. This rock shaft has at one side a crank 18 and at the opposite side a similar crank 18ª. These cranks are connected with the connecting pieces 19, the ends thereof being connected to the cranks 20 on the cross shaft 22. The cranks 20 are connected to the brake shoe supporting pieces 23 which are pivoted to the lugs 24 on the brake shoes 25 associated with the driving wheels 5. The brake shoes and supporting pieces are supported by the pivoted supports 26 pivotally connected with the lugs 27 on the frame. The supporting pieces 23 are connected by the adjustable links 28 with the brake shoe supporting pieces 29 pivotally connected with the lugs 30 on the brake shoes 31 associated with the wheels 6. The supporting pieces 29 are connected to the ends of the curved cross-piece 32, which ends are slidably mounted in the supports 33 on the end section 2, said supports being provided with slots 34 so that the cross-piece 32 may be moved back and forth to set or release the brakes. It will thus be seen that when the hand wheel 10 is rotated in one direction it will move the connecting pieces 19 in the direction of the arrow, Fig. 1. This will tend to pull the brake shoes 25 against the wheels 5 and by means of the link 28 will tend to push the brake shoes 31 against the wheels 6 and to move the cross-piece 32 forward, that is, in the direction of the arrow, Fig. 2. By holding the cross-piece against forward movement or limiting its forward movement, it will be seen that the further rotation of the wheel 10 will set the brakes 25 and 31. The motion is transmitted to the brakes at the other end of the locomotive by the actuating connection 35. This connection is provided at one end with the fork 36 in which the cross-piece 32 is received, there being a roller 37 which engages the front face of the cross-piece. This actuating connection is made adjustable in any desired manner, as by the turn buckle 38. The actuating connection is provided at the other end with a similar fork 39 provided with a roller 40 which engages a similar cross-piece 41 slidably mounted on the supports 42 on the section 3, said supports having the slots 43. The ends of the cross-piece 41 are connected with the brake shoe supporting pieces 44 which are pivoted to the lugs 45 on the brake shoes 46, and are connected by the links 47 with the brake shoe supports 48 pivoted to the lugs 49 on the brake shoes 50 associated with the driving wheels 5. The supporting pieces 48 are pivotally connected at 51 with the bracket 52 on the frame. It will thus be seen that as the cross-piece 32 is pulled forward the actuating connection 35 also pulls the cross-piece 41 forward and this moves the brake shoes 46 and 50 against their associated wheels. When the locomotive passes around curves, the rollers 37 and 40 roll along the curved faces of the cross-pieces 32 and 41 without interfering in any manner with the setting of the brakes and preferably without increasing the pressure of the brakes on the wheels. It will further be seen that the brakes may be completely and wholly controlled and operated from one of the end sections under all the varying conditions presented.

I have described in detail a particular construction embodying my invention, but it is of course evident that the parts may be varied in many particulars without departing from the spirit of my invention, and I therefore do not limit myself to the particular construction shown.

If the curved faces of the curved cross-pieces 32 and 41 are arranged so that the curve is concentric with the axes of the pivots which connect the end sections with the central section, the brakes will be neither tightened nor loosened when the locomotive is passing around curves. Since, however, when such locomotive is passing around curves, the flanges of the wheels by their engagement with the rails, produce a braking effect, it is sometimes desirable to compensate for this by slightly releasing the brakes when the locomotive is traveling around curves. In the present structure, this result is secured by slightly flattening the curved faces 32ª and 32ᵇ and 41ª and 41ᵇ, so that these faces are not concentric with the axes of the pivots but are farther away from these axes than the central portions of the curved faces. It will thus be seen that as the rollers 40 and 37 roll onto these flattened faces when the locomotive is passing around curves, the pressure of the brake shoes is slightly released, thus reducing the braking effect of the brake shoes in such a manner that this braking effect together with the braking effect of the flanges of the wheels is substantially the same as the braking effect of the brake shoes on a straight track. This therefore makes the entire braking effect practically uniform under all conditions.

I claim:

1. A locomotive comprising three sections, two of said sections provided with wheels and forming wheeled sections, the third section carried by the wheeled sections, brakes for the wheels on said wheeled sections, a device on one of said sections for actuating the brakes thereon, and a compensating connection extending from one end section to the other end section for actuating the brakes on said latter end section, said compensating connection adapted to compensate for the variation in the relative position of the three sections in passing around curves, a device on one of said wheeled sections to which power is initially applied to actuate said brakes.

2. A locomotive comprising three sections, two of said sections being provided with wheels and forming wheeled sections, said wheeled sections being pivotally connected with the third section, brakes for the wheels on said wheeled sections, actuating mechanism for said brakes, a device on one of said wheeled sections to which power is initially applied to actuate said brakes, a connecting device between the brakes of the two wheeled sections comprising two separated cross-pieces having curved faces, connections between each cross-piece and the brake shoes of the section with which it is associated, a connecting piece connecting the two cross-pieces, said connecting piece engaging the curved faces of said cross-pieces.

3. A locomotive comprising three sections pivotally connected together, wheels on two of said sections, brake shoes for the wheels of one wheeled section, an actuating mechanism for said brake shoes extending to the other wheeled section, and a device on said latter wheeled section to which power is initially applied to actuate said actuating mechanism to operate said brakes, said device and said brake shoes and actuating mechanism being all supported independent of said central section.

4. A locomotive comprising three sections pivotally connected together, wheels on two of said sections, brake shoes for the wheels of said wheeled sections, a curved cross-piece on each wheeled section, an actuating connection extending between said curved cross-pieces and movably connected with both of them and adapted to engage them at various points of the curved portions thereof, a connection between said cross-piece and said brake shoes, and a device on one of said wheeled sections to which power is initially applied for moving said connections to set the brake shoes, said third section comprising a spacing compression member between the wheeled sections and being otherwise independent of the brake mechanism.

5. A locomotive comprising three sections pivotally connected together, wheels on two of said sections, the third section being carried by the wheeled sections, a cross piece on each of said sections with which the brake shoes are connected, said cross pieces having curved faces, an actuating connection between said cross pieces, the portions of the curved faces of each cross piece nearest the ends thereof being farther away than the central portion thereof, from the axis of the pivot connecting the third section with the wheeled section with which said cross piece is associated.

6. A locomotive comprising three sections, a central section and two end sections, the end sections pivotally connected with the central section, wheels on said end sections, brake shoes for said wheels, actuating mechanism for said brake shoes, a connecting device between the brake shoes of the two end sections comprising two separated cross-pieces having curved faces, the portions of the curved face of each cross-piece nearest the ends thereof being farther away than the central portion thereof, from the axis of the pivot connecting the central section and the end section with which said cross-piece is associated, connections between each cross-piece and the brake shoes of the section with which it is associated, and a connecting piece connecting the two cross-pieces, said connecting piece engaging the curved faces.

In testimony whereof, I affix my signature in the presence of two witnesses this 6th day of July, 1916.

CHARLES A. PRATT.

Witnesses:
ELLA THIEME,
CHRISTINA DEANS.